United States Patent
Livingston

(10) Patent No.: US 6,172,826 B1
(45) Date of Patent: Jan. 9, 2001

(54) ACTIVE RESONANT FILTER

(75) Inventor: Peter M. Livingston, Palos Verdes Estates, CA (US)

(73) Assignee: TRW Inc., Redondo Beach, CA (US)

( * ) Notice: Under 35 U.S.C. 154(b), the term of this patent shall be extended for 0 days.

(21) Appl. No.: 08/984,349

(22) Filed: Dec. 3, 1997

(51) Int. Cl.$^7$ ............... G02B 5/22; G01J 1/00; G01T 1/18; H10S 3/08
(52) U.S. Cl. ............ 359/885; 250/336.1; 250/374; 372/92; 372/66
(58) Field of Search ............ 359/885, 886; 372/37, 66, 92; 250/332, 481, 336.1, 374; 356/425

(56) References Cited

U.S. PATENT DOCUMENTS

| | | |
|---|---|---|
| 4,208,129 * | 6/1980 | Spnecer .................... 356/425 |
| 4,829,597 | 5/1989 | Gelbwachs ................ 250/361 |
| 4,880,978 | 11/1989 | Cohn et al. ............... 250/332 |
| 5,079,414 | 1/1992 | Martin ..................... 250/203.3 |
| 5,081,361 | 1/1992 | Rieger . | 
| 5,111,047 | 5/1992 | Brock ...................... 250/336.1 |
| 5,130,546 | 7/1992 | Keeler ..................... 250/458.1 |
| 5,181,135 | 1/1993 | Keeler . |
| 5,181,212 | 1/1993 | Moberg .................... 372/22 |
| 5,301,051 | 4/1994 | Geller ...................... 250/374 |
| 5,311,369 | 5/1994 | Gelbwachs ................ 359/886 |
| 5,394,238 | 2/1995 | Mocker et al. ............ 356/342 |

* cited by examiner

*Primary Examiner*—Audrey Chang
(74) *Attorney, Agent, or Firm*—Michael S. Yatsko

(57) ABSTRACT

A resonant absorption cell filled with a gas, selected in accordance with the wavelength of the laser radiation of interest, such as DF. The gas within the cell is maintained at substantially atmospheric pressure. The energy state of the gas within the cell is raised by either external resistance heating or optical pumping. In an increased energy state, gas molecules resonate with the incoming laser radiation causing the molecules to absorb incident photons before the gas molecules have a chance to re-radiate the captured photons, collisions with other gas molecules within the cell transfer the excitation energy into heat in order to filter out laser radiation but past all other wavelengths.

13 Claims, 5 Drawing Sheets

ACTIVE RESONANT FILTER

BACKGROUND OF THE INVENTION

1. Field of the Invention

The present invention relates to an optical filter for use with, for example, a missile tracking system, and more particularly to an active resonant absorption cell for protecting a radiation detecting system from incident laser radiation; the absorption cell filled with a gas selected in accordance with the wavelength of the laser radiation to be filtered, such as deuterium fluoride (DF); the cell utilizing external resistance heating or optical pumping to raise the energy state of the gas within the cell to increase its absorption level to enable the incident laser radiation to be absorbed.

2. Description of the Prior Art

Various optical filters are known for use with different wavelengths. For example, in the 400–700 millimeter range, atomic resonant filters are known to be used as optical band pass filters to filter various types of noise, such as sunlight. Both active and passive atomic resonant filters are known. Such atomic resonant filters normally include a pair of spaced apart optical filters, used to form a hermetically sealed cell filled with an atomic vapor and an inert buffer gas. Active atomic resonant filters, for example, as disclosed in U.S. Pat. No. 4,829,597, are known to utilize lasers for raising the energy state of the atomic gas. Passive atomic resonant filters, for example, as disclosed in U.S. Pat. Nos. 5,081,361 and 5,311,369, are known to employ rubidium and cesium vapors while active resonant filters are known to employ sodium, thallium, rubidium, magnesium and calcium. In such atomic filters, the atomic vapor absorbs the photons from the incident radiation thereby increasing the energy state of the vapor. Collisions between the vapor in the raised energy state and the buffer gas further increase the energy state of the vapor causing the atomic vapor to return to a lower metastable energy level and emit radiation at a different wavelength.

U.S. Pat. No. 5,111,047, assigned to the same assignee as the assignee of the present invention, discloses an ionization type atomic resonant filter. Such a filter includes a chamber with a selective molecular vapor and an inert buffer gas. Incoming radiation is filtered by an optical filter. Photons from radiation received in the chamber raise the energy level of the molecular vapor to a metastable state. Collisions between the molecular vapor and the inert buffer gas cause ionization of a significant portion of a molecular vapor. An electrical field is used to collect free ions to produce an electrical current that is proportional to the incident radiation of interest.

Resonant absorption cells are also known for filtering laser radiation, for example, from a chemical laser, such as hydrogen fluoride (HF) and DF lasers for example, as described in detail in "High Energy-High Average Power Pulsed HF/DF Chemical Laser", by H. Burnet, M. Mabru and F. Voignier SPIE Vol. 2502 pgs. 388–392, hereby incorporated by reference. An example of such a resonant absorption cell is described in U.S. Pat. No. 4,880,978. Such an absorption cell includes a hermetically sealed chamber, two walls of which are formed by optical filters. The absorption cell is filled with a gas under pressure. A pair of electrodes is disposed within the cell and connected to a high voltage power supply (i.e. 25 kV) for generating an arc within the cell. The arc causes the gas molecules in the cell to be heated by plasma discharge thereby exciting the gas molecules to a relatively high energy state. By raising the energy state of the gas vapor, the absorption properties of the gas are increased to enable unwanted laser radiation to be absorbed.

Such filters as described above are used in various laser communication, imaging and tracking systems for example, as disclosed in U.S. Pat. Nos. 4,829,597; 5,079,414 and 5,181,135, for filtering radiation of various unwanted wavelengths. For example, the atomic resonant filters described above, are normally used to filter radiation in the 400–700 milliammeter range. The resonant absorption cells are used for filtering laser radiation for example, from HF/DF chemical laser and the high frequency range.

There are various drawbacks with the various optical filters discussed above. For example, the resonant absorption cell described above requires a hermetically sealed cell filled with a gas under pressure. As mentioned above the energy state of the gas is raised by plasma discharge which requires electrodes within the hermetically sealed cell connected to a power supply external to the cell; thus requiring hermetic sealing of the electrical conductors which penetrate the walls of the cell which increases the complexity as well as the cost of the cell. Additionally, a relatively high voltage power supply, 25 kV is required which further increases the complexity and cost of the cell.

SUMMARY OF THE INVENTION

It is an object of the present invention to solve various problems in the prior art.

It is yet another object of the present invention to provide a resonant absorption cell which eliminates the need for electrodes within the cell.

It is a further object of the present invention to provide a resonant absorption cell in which the gas within the cell can be maintained at substantially atmospheric pressure.

The present invention relates to a resonant absorption cell filled with a gas, selected in accordance with the wavelength of the laser radiation of interest, such as DF. The gas within the cell is maintained at substantially atmospheric pressure. The energy state of the gas within the cell is raised by either external resistance heating or optical pumping. In an increased energy state, gas molecules resonate with the incoming laser radiation causing the molecules to absorb incident photons before the gas molecules have a chance to re-radiate the captured photons, collisions with other gas molecules within the cell transfer the excitation energy into heat in order to filter out laser radiation but pass all other wavelengths.

DESCRIPTION OF THE DRAWINGS

These and other objects of the present invention will be readily understood with reference to the following specification and attached drawing, wherein.

Figure 2:
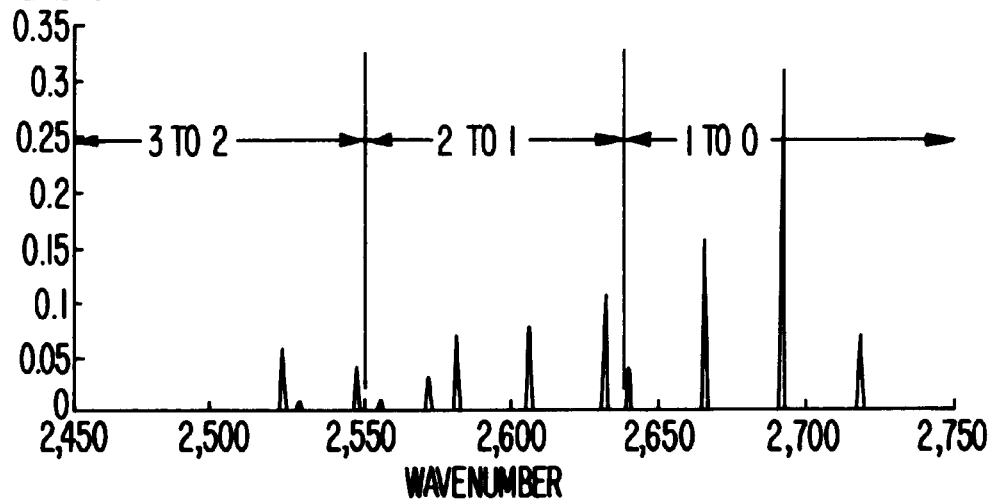
FIG. 2 is a spectral diagram of a known laser illustrating the wave number of the laser of the function of relative line strength at the 3 to 2, 2 to 1 and 1 to 0 vibrational levels.

and 3000°K(shown dotted which illustrates the attenuation of the laser lines by the active resonant absorption cell in accordance with the present invention of the laser illustrated in FIG. 2.)

Figure 5:
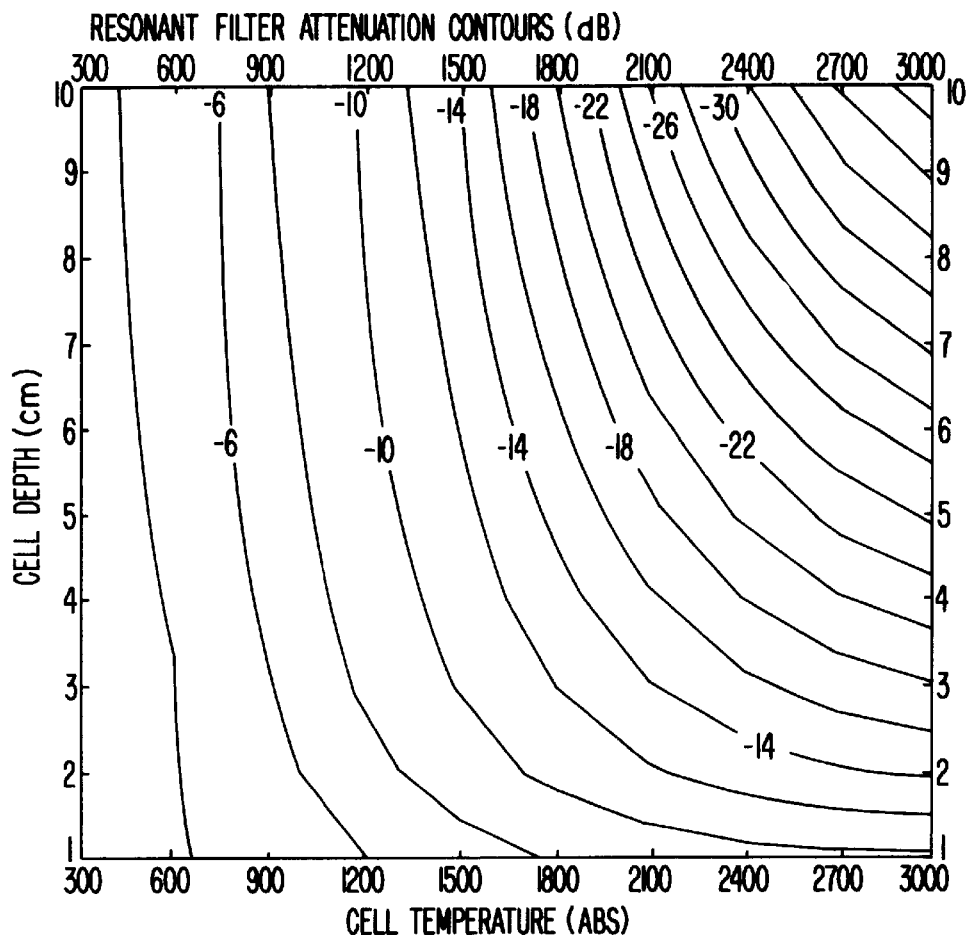

FIG. 5 is a contour plot illustrating the attenuation contours in dB of the active resonant absorption cell in accordance with the present invention as a function of the cell temperature in °K and cell depth in centimeters.

Figure 6:
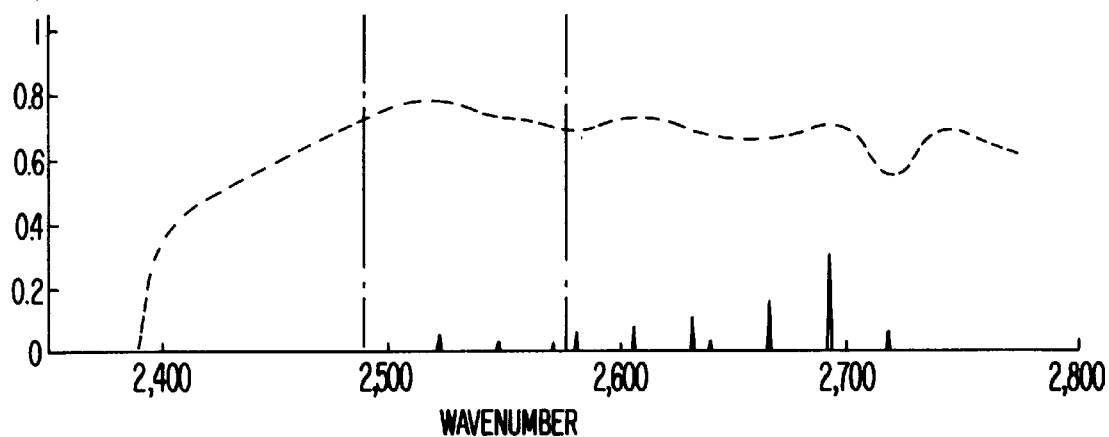

FIG. 6 is a transmissivity diagram of a notch filter which optionally may form a portion of the present invention which illustrates the transmissivity of the notch filter as a function of the wave number of the laser illustrated in FIG. 2.

Figure 7:
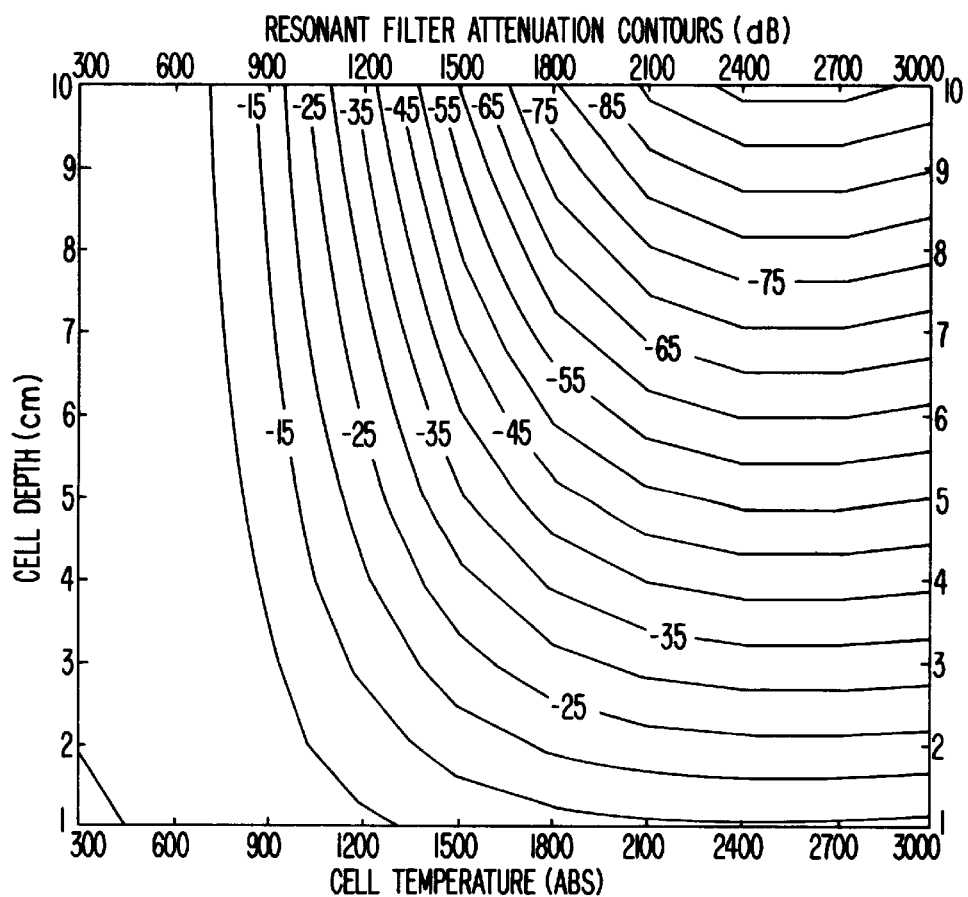

FIG. 7 is similar to FIG. 5 but for a combination of a notch filter illustrated in FIG. 6 and the active resonant absorption in accordance with the present invention.

Figure 8:
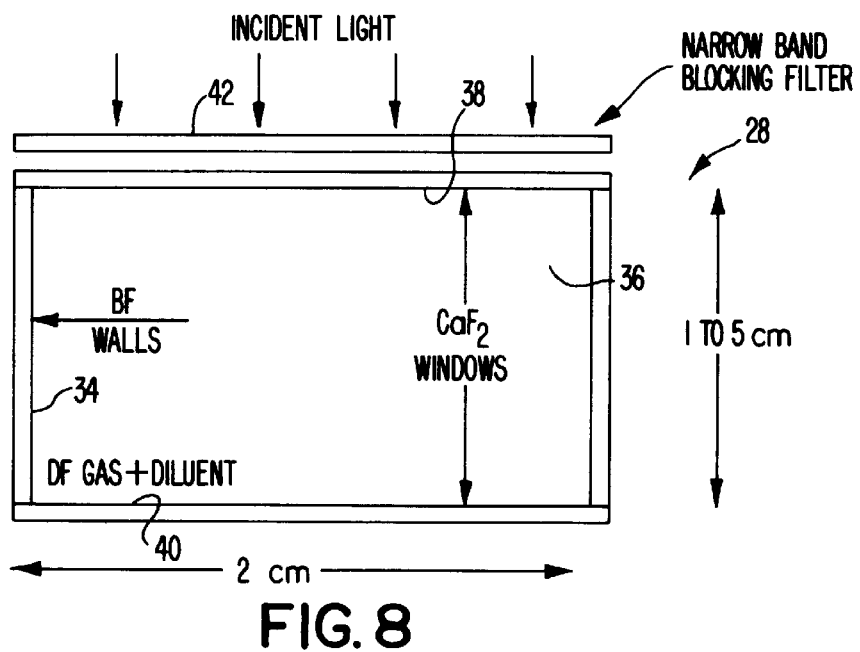

FIG. 8 is a simplified plan view of the active resonant absorption filter in accordance with the present invention.

Figure 9A:
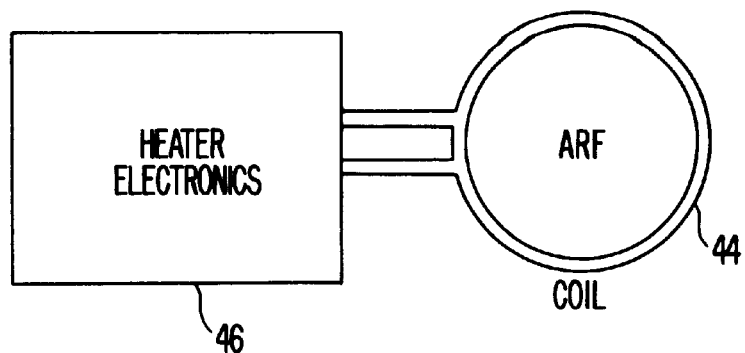

FIG. 9a is a plan view of one embodiment of the active resonant absorption cell illustrating the use of an external resistance heating system for raising the energy state of the gas within the cell.

Figure 9B:
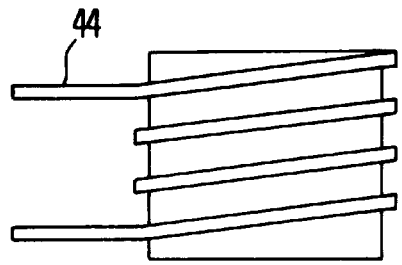

FIG. 9b is an elevation view of the embodiment illustrated in FIG. 9a.

Figure 10:
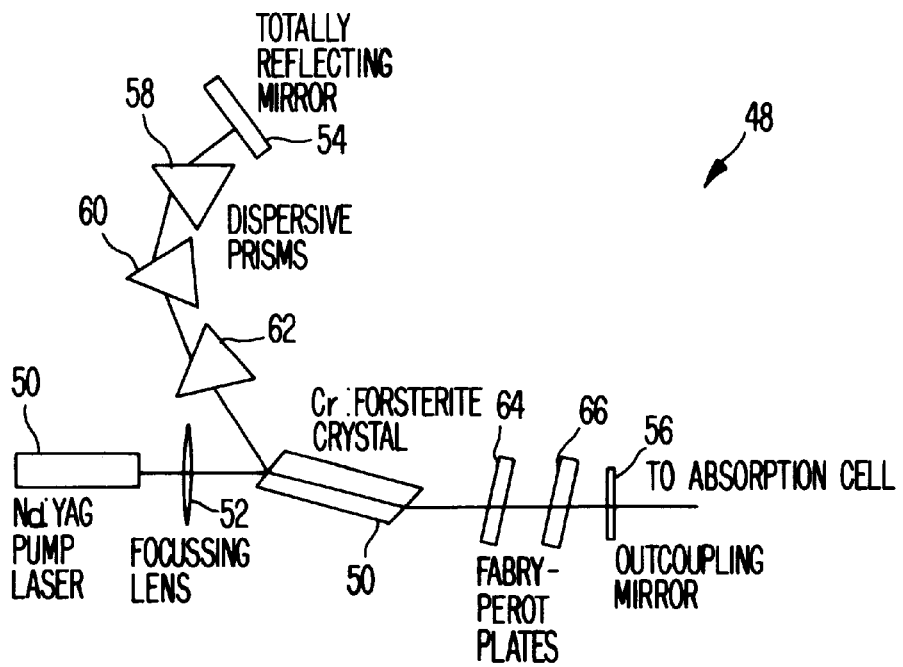

FIG. 10 is a simplified optical diagram of an alternate embodiment of the invention, shown with the absorption cell removed illustrating a system utilizing optical pumping to increase the energy state of the gas within the cell.

DETAILED DESCRIPTION

The present invention relates to an active resonant absorption cell that is particularly suitable for use with a mid-infrared (3.6 to 4.2 micron) passive tracking system for tracking various targets, such as missile targets. Presently, known active tracking systems are known to be used with laser weaponry, such as a theater high energy laser (THEL). Such active tracking systems are known to use a pulsed laser illuminator in the near infrared range around 1.54 microns. However, there are several known performance deficiencies in such active tracking systems due to laser pulsed energy level; attenuation losses under low visibility conditions; and loss of image resolution during high turbulence conditions. Although passive tracking systems are known in the mid-infrared range (i.e. 3.6 to 4.2 microns), which are known to be less effective by attenuation and turbulence, such passive tracking systems have heretofore not been known to be used in such applications for various reasons. For example, in such an application, laser radiation in the range between 3.6 and 4.0 microns scattered from the missile target can "blind" the imaging system causing gross distortions of the target features making the target relatively impossible to track. Although various optical filters are known for blocking the scattered radiation, the use of such optical filters causes other performance problems for the passive tracking system. In particular, the use of an optical filter to block the scattered radiation from the missile target tends to limit the available range of the tracking system to about 4.1 to 4.2 microns as limited by atmospheric attenuation. Such a narrow range reduces the target to background range which reduces the range of the tracking system to an unacceptable level.

The active resonant absorption cell or filter (hereinafter ARF) in accordance with the present invention is adapted to be utilized with such passive tracking systems while obviating the performance deficiencies discussed above. In addition, the ARF in accordance with the present invention is relatively less complex and less expensive than other known active resonant absorption cells as discussed above.

Figure 1:
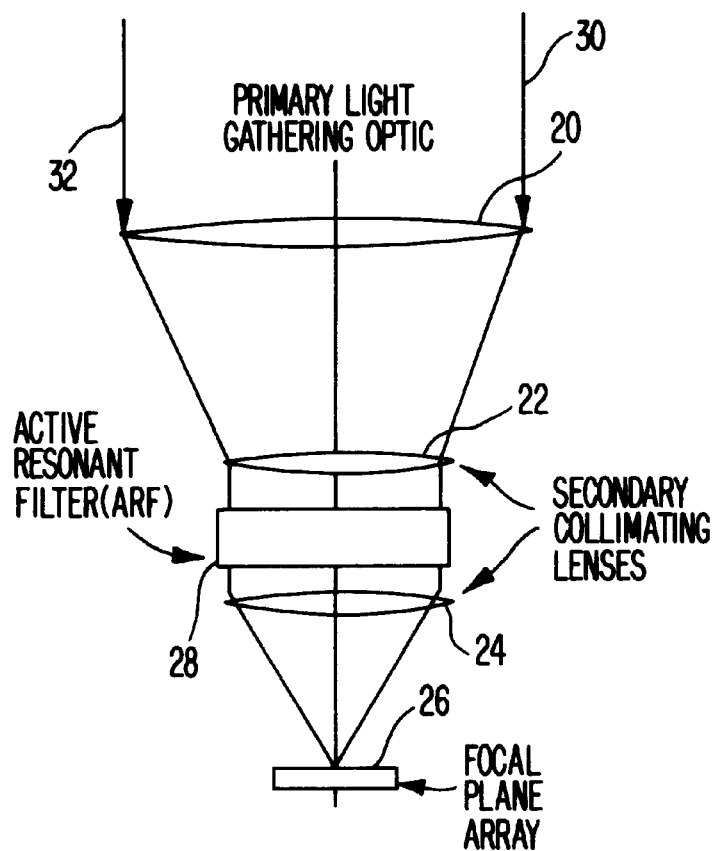
FIG. 1 is a simplified schematic diagram of an optical imaging system incorporates the active resonant absorption cell in accordance with the present invention.

Referring to FIG. 1, an exemplary imaging system is shown which may form a portion of a passive infrared tracking system. The exemplary imaging system includes a primary lens 20, one or more secondary collimating lenses 22 and 24 and an imaging device 26, such as a focal plane array. The ARF, in accordance with the present invention and generally identified with the reference numeral 28 is disposed between the secondary collimating lenses 22 and 24. Incident radiation, as represented by the arrows and 32, is collected by the primary lens 20 and directed to the first secondary collimating lens 22 which, in turn, passes the radiation to the ARF 28. As will be discussed in more detail below, the ARF 28 attenuates laser radiation, for example, reflected laser radiation from a missile target, passes all other radiation to the second secondary colluminating lens 24, which, in turn, passes the radiation to the imaging device 26. By placing the ARF 28 in the region of the colliminated light, i.e. after the secondary colluminating lens 22, relatively high quality imaging by the passive tracking system is attained.

The ARF 28 in accordance with the present invention works on the same principle as a chemical laser, such as a DF chemical laser as discussed above. More particularly, the active ingredient of the ARF 28 is a gas, such as DF, or other gas selected based on the particular wavelength of the laser radiation to be filtered. For example, a DF gas may be used to filter laser radiation from a DF chemical laser. However, unlike a chemical laser, the gas in the ARF 28 is confined to a relatively small cell at a pressure near atmospheric pressure. As will be discussed in more detail below, an external energy source is provided to increase the energy levels of the molecules forming the gas. Incident laser radiation causes the gas molecules to resonate, thereby increasing the absorption capability of the gas within the cell to enable the gas molecules to absorb incident photons from the laser radiation which raises the energy level of the gas molecules. Before the gas molecules radiate the captured photons, collisions with other gas molecules transfer the exitation energy to heat. As such, the ARF 28 in accordance with the present invention is adapted to absorb laser radiation while passing radiation of all other wavelengths.

There are various design considerations associated with the absorption cell, such as the laser gain/loss coefficient for the cell as well as the length of the cell as well as the exitation energy for increasing the vibrational level of the gas within the cell for the laser wavelengths of interest. These considerations discussed in detail in "Handbook of Chemical Lasers" by R. W. F. Gross and N. F. Bott, Riley Science, John Riley & Sons New York pgs. 472–498, hereby incorporated by reference. The laser gain/loss coefficient for the absorption cell as a function of wavelength A ($\omega$) given by equation (1) below:

$$\alpha(\omega) = \frac{hB_{1 \to u}}{4\pi} \omega_c \phi(\omega - \omega_c) \left( \frac{g_1}{g_u} N_u - N_1 \right) \qquad 1$$

where h is Planck's constant; B is the Einstein co-efficient; $\omega_c$ is the laser center frequency; $\phi$ is the laser line shape function; g represents the degeneracies and n represents the populations of the upper and lower states participating in the transition.

Equation (2) below is an expanded version of equation (1) where the variable ∫ is given by equation (3) below:

$$\alpha(\omega, \upsilon, J, -1) = \qquad\qquad 2$$
$$\frac{hN_A}{4\pi}\omega_c(\upsilon, J, -1)\phi(\omega - \omega_c)\frac{PM_W}{RT}B(\upsilon, J, -1)(2J+1)\int$$

$$\int = \left[\frac{n(\upsilon+1)}{Q_{rot}^{\upsilon+1}}e\frac{hc}{kT}E_{\upsilon+}, \int_{-1}^{\cdot} -\frac{n(\upsilon)}{Q_{rot}^u}e^{he}\overline{kT}E_{\upsilon'}J\right] \qquad 3$$

where v,J are the vibrational and rotational quantum numbers associated with the vibronic state; $N_A$ is Avogadro's number, p is the gas pressure in atmospheres, $M_W$ is the new molecular weight in grams of the absorber; R is the gas constant and $cm^3$ atmospheric units; B (v, J,-1) are the Einstein B coefficients for the v, J-th state, p-branch; n(v) is the relative population in the vibrational v state; Q is the rotational sum-over-states for a particular function; and $E_{v,J}$ is the energy and wave numbers of the V, J-th level.

The design considerations for selecting the cell length and temperatures are best understood with reference to FIGS. 2–5 below. FIG. 2 is a spectral diagram of a known laser, for example, MIRACL Laser, "Mid Infrared Advanced Chemical Laser"; a large, high power ($^{18}$ 2 MW) laser built by TRW and presently operating at the White Sands Missile Test Range, illustrating the wave numbers as a function of the laser line length for three vibrational energy levels; 3 to 2; 2 to 1 and 1 to 0. For such a laser spectrum, the absorption cell must have some vibrational population in the second vibrational level (i.e. 2 to 1 level) in order to be able to absorb hot 3 to 2 transitions the long wavelength portion of the DF spectrum around 3.9 to 4.0 microns. As such, the temperature of the gas within the absorption cell would have to be for example, 1000° K. However, other lasers, such as the THEL have fewer laser lines than the MIRACL laser and thus, a "colder" spectrum with most transitions in the 1-0 vibrational level and a relatively few in the 2-1 vibrational level in which case the temperature of the absorption cell could be substantially lower than 1000° K.

Figure 3:
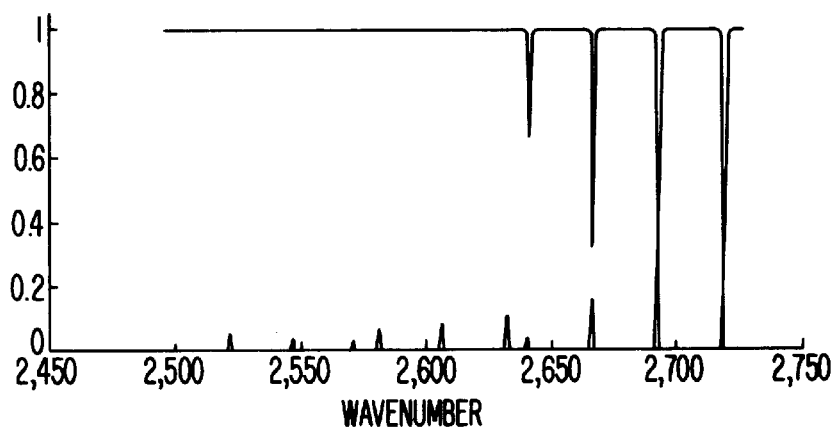
FIG. 3 is a spectral diagram of the active resonant absorption cell in accordance with the present invention at room temperature which illustrates the attenuation of the laser lines in the 1 to 0 vibrational level in the laser illustrated in FIG. 2.

FIG. 3 illustrates a "cold" room temperature absorption cell for a 1 cm cell at one atmospheric pressure at a temperature of 300° K. As shown, such an absorption cell works well against the laser lines with the largest relative line strength in the cold 1 to 0 vibrational level at essentially room temperature. However, at such a temperature, the absorption cell does not attenuate laser lines at the "hotter" 2 to 1 and 3 to 2 vibrational levels. However, the laser lines at the "hotter" vibrational levels are relatively low power.

Figure 4:
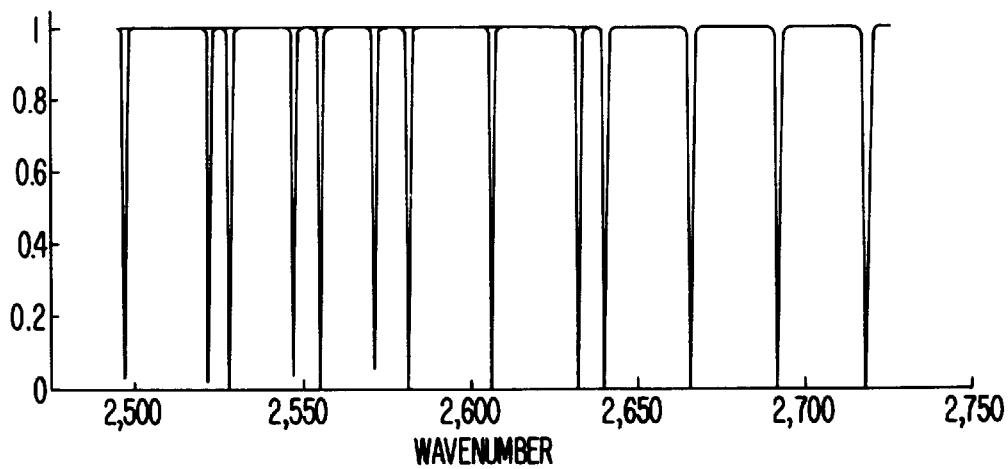
FIG. 4 is a spectral diagram of an active resonant absorption cell at 300°K(shown solid); 1500° K(shown dashed)

FIG. 4 illustrates the affect of heating the absorption cell. In particular, the attenuation affects of an absorption cell formed with a cell length of 5 cm at one atmosphere is shown at three different temperatures: 300° K (shown dotted); 1500° K (shown with dashed lines); and 3000° K (shown dotted). As shown, at a cell length of 5 cm, increased temperature results in attenuation at increased laser wave numbers. The effects of cell length as a function of temperature are more clearly illustrated in FIG. 5 which is an illustration of an attenuation contours of the absorption filter as a function of cell length in cm and cell temperature in K°. As shown, the 26 dB attenuation contour never falls below a vibrational temperature of 2100° K for a cell length up to 10 cm. Increased heating is required to populate the second vibrational state in order to increase the absorptive properties of the gas within the cell.

In accordance with an important aspect of an alternate embodiment of the invention the trade off between cell length and cell temperature can be optimized through the use of a relatively narrow notch filter. FIG. 6 illustrates the transmissivity of a notch filter as a function of wave number for a MIRACL-like laser spectrum. As shown, in FIG. 6 the notch filter attenuates the 2 to 1 vibrational level to absorb hot 3 to 2 transitions. The effect of the notch filter in combination with the absorption cell in accordance with the present invention is best illustrated with reference to FIG. 7, which illustrates the attenuation contours of the combination in dB as a function of cell length and cell temperature. As shown, at the 25 dB level the cell temperature is less than 1200° for cell lengths between 5 and 10 cm; essentially half the acquired vibrational temperature without the notch filter.

The attenuation level is a function of the laser spectrum as well as the system, for example, a passive tracking system, in which the absorption cell is used. In an application for a passive tracking system, for example, as illustrated in FIG. 1, the attenuation is selected so that the system will provide high resolution imaging while attenuating scattered laser radiation from the missile target. For example, in an application where the difference in radiation between the laser lines scatter and a 100° black body is about 40 to 50 dB, a 20–25 dB attenuation by the absorption cell would allow the imaging system to provide relatively high resolution while attenuating scattered laser radiation from the missile target. If a laser is used, such as a THEL laser having a spectrum with no 3 to 2 vibrational-rotational transitions, the notch filter could be eliminated and the absorption cell operated at room temperature.

FIG. 8 illustrates an absorption cell for ARF 28 in accordance with the present invention. As shown, the ARF 28 may be formed in a generally cylindrical configuration, for example, having a diameter of 2 cm, defining a side wall 34 and opposing windows 38 and 40, selected from materials which are compatible with the presence of the hot gases, for example, DF gas within the cell 28. The geometry of the cell may be selected in order to reduce the signal to noise ratio of the scene. For example, the cell may be configured such that the sidewall 34 is not in view of imaging device 26.

The side wall 34 can be formed from boron fluoride BF. The opposing windows 38 and 40 may be formed from calcium fluoride ($CaF_2$). The absorption cell defines a chamber 36 which may be hermetically sealed. The chamber 36 is filled with a gas selected to filter the laser wavelength of interest such as DF gas plus a diluent, such as helium or nitrogen. Depending upon the spectrum of the particular laser being utilized with the tracking system, the notch filter 40 can be used and disposed adjacent the window 38. As mentioned above, if the laser used with the tracking system does not have 3 to 2 transitions the narrow band notch or blocking filter 40 may be eliminated. The length of the chamber may be selected from FIGS. 5 and 7 respectively as discussed above, for example 1 to 5 cm. The pressure within the chamber 36 may be maintained at one atmosphere.

As discussed above, in order to raise the energy level or vibrational state the gas within the chamber 36 in accordance with an important aspect of the invention, external energy sources are utilized to raise the energy level of the gas within the chamber. FIGS. 9a and 9b illustrate one embodiment of the invention which utilizes an external resistance wire 44 coiled around the outside of the absorption cell. The resistance heating coil 44 is coupled to an external power supply 46. Given the relatively small size of the absorption cell, 60 watts or less of electrical power will be required.

In an alternate embodiment of the invention as illustrated in FIG. 10, an external optical pumping system is used to raise the vibrational level of the gas within the cell as illustrated in FIG. 10. The optical pumping system generally identified with the reference numeral 48 includes a Nb:YAG pump laser 50 which produces, for example 1.06 µm pulse radiation that is focused on a chrominium-doped forsterite crystal 50 by way of a focusing lens 52. The 1.06 µm radiation simulates emission (or "pumps") in the 1.16 to 1.33 µm band within the cavity defined by a totally reflecting mirror 54 and an out-coupling mirror 56. A plurality of dispersive prisms 58, 60 and 62 are used to spread the simulated emission from the crystal 50. One or more Fabry-Perot plates 64, 66 are used to tune the emission to the desired wavelength. The output of out-coupling mirror 56 is applied to the absorption cell. The Fabry-Perot plates 64 and 66 may be formed to be 0.2 and 2.0 mm thick with each face being 50% reflective. The output coupler mirror 56 may be 70% reflective and the cavity length may be selected to be 65 cm. Such an optical system is discussed in detail in "Deuterium Fluoride Laser Produces Mid-IR Output" by Roland Roux, Laser Focus World December 1996 pgs. 29–32, hereby incorporated by reference.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

I claim:

1. An active resonant filter for absorbing radiation at a predetermined wavelength, comprising:

an absorptive cell having a predetermined geometry, said cell forming a cavity and formed to carry a gas at substantially one atmosphere; and means, disposed external to said cell for raising the energy state of said gas within said cell to enable said gas to absorb radiation at one or more predetermined wavelengths.

2. The active resonant filter as recited in claim 1, wherein said gas is HF.

3. The active resonant filter as recited in claim 1, wherein said gas is DF.

4. The active resonant filter as recited in claim 1, wherein said cell is formed with a generally cylindrical shape defining a sidewall and opposing windows.

5. The active resonant filter as recited in claim 4, wherein said sidewall is formed from BF.

6. The active resonant filter as recited in claim 4, wherein said windows are formed from $CaF_2$.

7. The cell as recited in claim 4, further including a notch filter disposed adjacent one said windows.

8. The active resonant filter as recited in claim 1, wherein said cell is hermetically sealed.

9. The active resonant filter as recited in claim 1, wherein the length of said cell is between 1 and 5 cm.

10. The active resonant filter as recited in claim 1, wherein the diameter of said cell is about 2 cm.

11. The active resonant filter as recited in claim 1, further including a diluent disposed within said cavity.

12. The active resonant filter as recited in claim 1, wherein said external means includes a resistance heater.

13. The active resonant filter as recited in claim 1, wherein said external means includes an optical pumping circuit.

\* \* \* \* \*